UNITED STATES PATENT OFFICE.

ERNEST F. BLOSS, OF CLEVELAND, OHIO.

PROCESS FOR PRODUCING EDIBLE LARD FROM HOG-MIDDLES.

1,063,107. Specification of Letters Patent. Patented May 27, 1913.

No Drawing. Application filed January 31, 1913. Serial No. 745,369.

*To all whom it may concern:*

Be it known that I, ERNEST F. BLOSS, a citizen of the United States, residing at Cleveland, in the county of Cuyahoga and State of Ohio, have invented a certain new and useful Improvement in Processes for Producing Edible Lard from Hog-Middles, of which the following is a full, clear, and exact description, reference being had to the accompanying drawings.

This invention relates to a process of treating "hog middles" so that the fatty substance in them may be rendered and used for edible lard. This product (comprising the coecum and the large and small colon, commonly known in packing houses as the large intestine or black gut) has heretofore been considered inedible, and therefore, in accordance with the requirements of the law, its only use was as waste or scrap in making grease. By my process it is so thoroughly cleansed that the fatty substance thereof may be melted and strained in the usual manner to make a first class lard. The melting of these fatty substances, to render the lard, is thoroughly understood by any one familiar with this art.

As my process does not require any special apparatus in carrying it out, no drawings will be necessary to describe it.

In performing my process, I take the hog middles, such as were formerly thrown out into the grease tank, and cut or rip them by hand or by machinery, as the case may be, so that when dipped in liquid for an appreciable length of time, all the parts of the middles will be thoroughly saturated. The next or second step is to take these ripped or cut middles and soak them in brine. The action of the brine is to thoroughly loosen the slime on the middles, and by the curing and cleansing action, the brine eliminates the offensive odor. I prefer to use a brine of about 70% strength, and leave the middles immersed in it for about three to twelve hours, the length of time being determined by the results accomplished. A 70% brine may be made by dissolving 1 lb. 11 oz. of common salt (sodium chlorid) in a gallon of water. After the slime becomes thoroughly loosened, which can be readily detected by observation, and the middles no longer give off any odor, the third step is to remove them from the brine, and immerse them in scalding water until the slime, which was loosened in the brine, is removed. This requires from five to twenty minutes of immersion in boiling water. They are then given another thorough washing, after which they are then taken to the lard tank where the fat is melted and strained off in the usual manner producing a high quality of lard.

The tests of this process in actual practice have proven that a thoroughly pure lard is produced, whereas before my invention, the grease which was melted from this portion of the hog was impure, altogether inedible, and unfit for human consumption.

I find by this process that a pound or more of lard is produced from each hog, which was formerly thrown away, or as above stated, melted off as a grease of much less value.

Having thus described my invention, what I claim is:

1. The process of producing lard from hog middles consisting of soaking them in brine and then scalding them to remove the loosened slime.

2. The process of producing lard from hog middles consisting of ripping them, soaking them in brine and then scalding them before putting them in the rendering tank.

3. A process of producing lard from hog middles consisting of ripping them, soaking them in brine until the slime is loosened, soaking them in hot water to remove the slime, then heating and melting off the cleansed fat which is strained off and cooled in the form of lard.

4. The process of producing lard from hog middles consisting of soaking them in brine for several hours until the slime is loosened and then scalding them with hot water for several minutes.

5. The process of producing lard from hog middles consisting of ripping them, soaking them in brine of about seventy per cent. strength from three to twelve hours, and then immersing them in boiling water from five to twenty minutes.

6. The process of producing lard from hog middles consisting of soaking them in brine until the slime is loosened and the odor obviated, scalding them with water, then washing them before putting them in a rendering tank.

In testimony whereof, I hereunto affix my signature in the presence of two witnesses.

ERNEST F. BLOSS.

Witnesses:
JUSTIN W. MACKLIN,
THEO. C. KELLER.

Copies of this patent may be obtained for five cents each, by addressing the "Commissioner of Patents, Washington, D. C."